(12) United States Patent
Marino

(10) Patent No.: US 12,276,093 B2
(45) Date of Patent: Apr. 15, 2025

(54) WATER VALVE MANIPULATION DEVICE

(71) Applicant: Lawrence Marino, Morris, IL (US)

(72) Inventor: Lawrence Marino, Morris, IL (US)

( * ) Notice: Subject to any disclaimer, the term of this patent is extended or adjusted under 35 U.S.C. 154(b) by 27 days.

(21) Appl. No.: 18/237,994

(22) Filed: Aug. 25, 2023

(65) Prior Publication Data

US 2025/0067030 A1    Feb. 27, 2025

(51) Int. Cl.
*E03B 9/08*  (2006.01)
*B25B 13/48* (2006.01)
*F16K 31/46* (2006.01)

(52) U.S. Cl.
CPC ............... *E03B 9/08* (2013.01); *B25B 13/48* (2013.01); *F16K 31/46* (2013.01)

(58) Field of Classification Search
CPC ............ E03B 9/08; F16K 31/46; B25B 13/48
See application file for complete search history.

(56) References Cited

U.S. PATENT DOCUMENTS

| 5,638,590 A | 6/1997 | Silano |
| 6,364,285 B1 | 4/2002 | Stinnett |
| 7,000,897 B2 | 2/2006 | Chick |
| 7,118,091 B2 * | 10/2006 | Price ..................... F16K 35/06 251/293 |
| 8,141,461 B1 | 3/2012 | Chandler |
| D743,222 S | 11/2015 | Smith |
| 9,630,301 B2 | 4/2017 | Ryans |
| 11,331,778 B2 | 5/2022 | Margol |
| 2015/0016501 A1 | 6/2015 | Braude |
| 2017/0307103 A1 * | 10/2017 | Freudendahl ....... F16K 37/0041 |

FOREIGN PATENT DOCUMENTS

| DE | 102004004933 A1 * | 8/2005 | ............... E03B 9/08 |
| KR | 20170056264 A  * | 5/2017 | |
| WO | WO2019215744 | 11/2019 | |

* cited by examiner

*Primary Examiner* — Atif H Chaudry

(57) ABSTRACT

A water valve manipulation device includes a socket wrench that has a shaft which is elongated to a length of at least 2.0 meters. The socket wrench can be extended down an access conduit to engage a test whip on a buried water line to facilitate a worker standing on the ground to manipulate the test whip. A gear box is attached to the socket wrench and the gear box has an output shaft that is oriented perpendicular to the socket wrench to engage a corporation valve on the water main. An input shaft is attached to the gear box such that the input shaft drives the gear box when the input shaft is rotated. The input shaft has a length sufficient to expose the engaging knob when the socket wrench is extended down the access conduit thereby facilitating the worker standing on the ground to close the corporation valve.

7 Claims, 5 Drawing Sheets

WATER VALVE MANIPULATION DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to water valve devices and more particularly pertains to a new water valve device for removing a test whip from a buried water line. The device includes a socket wrench that is elongated to extend into a conduit to engage a test whip on a buried water line. The device includes a gear box which has an output shaft that engages a corporation valve and an input shaft that extends upwardly along the socket wrench which can be rotated drive the gear box for closing the corporation valve.

(2) Description of Related Art Including Information Disclosed Under 37 CFR 1.97 and 1.98

The prior art relates to water valve devices including a variety of water valve wrenches that each at least includes a T-handle and a wrench head disposed on the T-handle for engaging a nut of a buried water valve. In no instance does the prior art disclose a socket wrench for engaging a test whip on a water line and a gearbox attached to the socket wrench which has an output shaft that engages a corporation valve on the water line to close the corporation valve and an input shaft that extends along the socket wrench for driving the gearbox.

BRIEF SUMMARY OF THE INVENTION

An embodiment of the disclosure meets the needs presented above by generally comprising a socket wrench that has a shaft which is elongated to a length of at least 2.0 meters. The socket wrench can be extended down an access conduit to engage a test whip on a buried water line to facilitate a worker standing on the ground to manipulate the test whip. A gear box is attached to the socket wrench and the gear box has an output shaft that is oriented perpendicular to the socket wrench to engage a corporation valve on the water main. An input shaft is attached to the gear box such that the input shaft drives the gear box when the input shaft is rotated. The input shaft has a length sufficient to expose the engaging knob when the socket wrench is extended down the access conduit thereby facilitating the worker standing on the ground to close the corporation valve.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
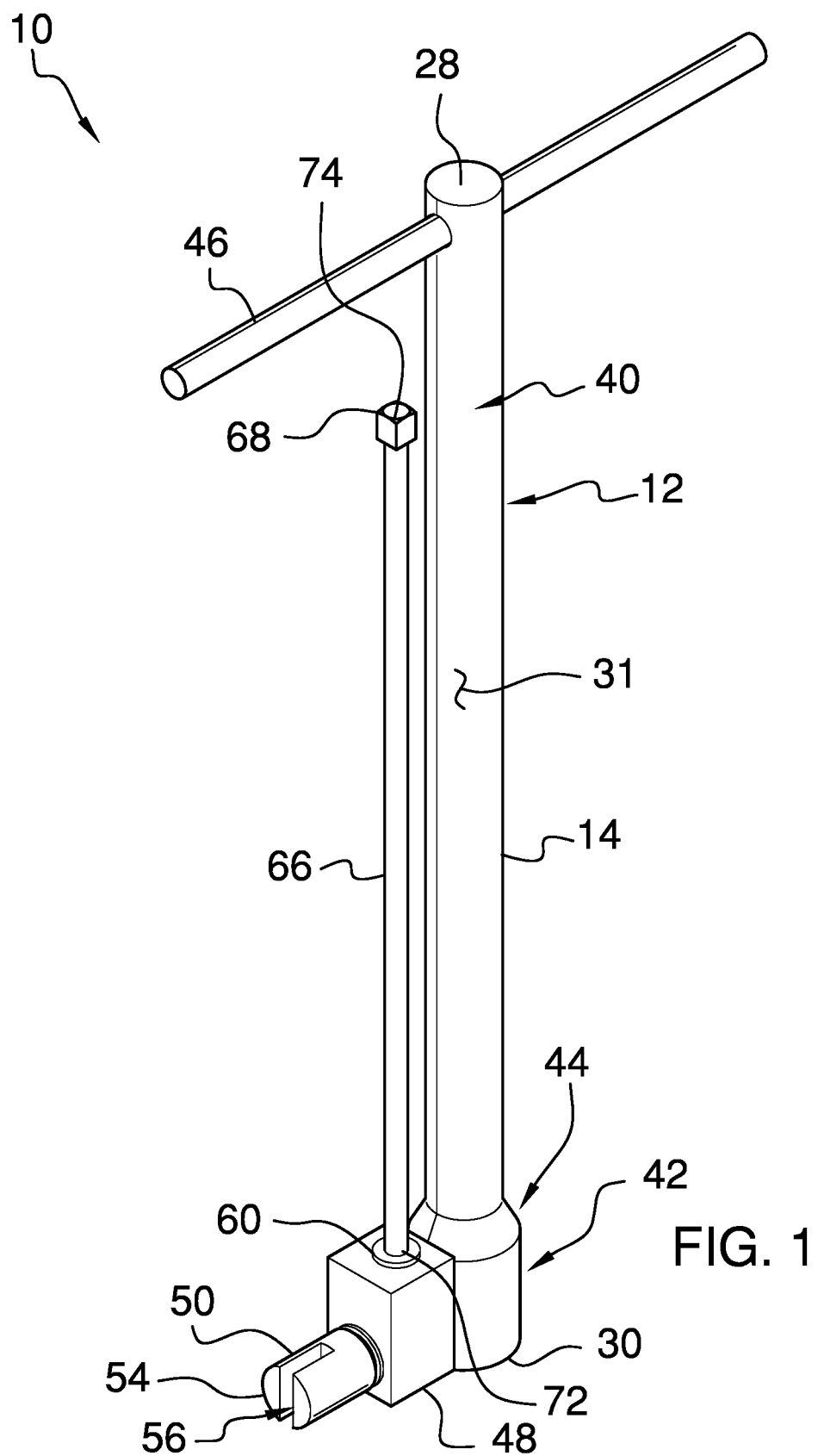
FIG. 1 is a perspective view of a water valve manipulation device according to an embodiment of the disclosure.
Figure 2:
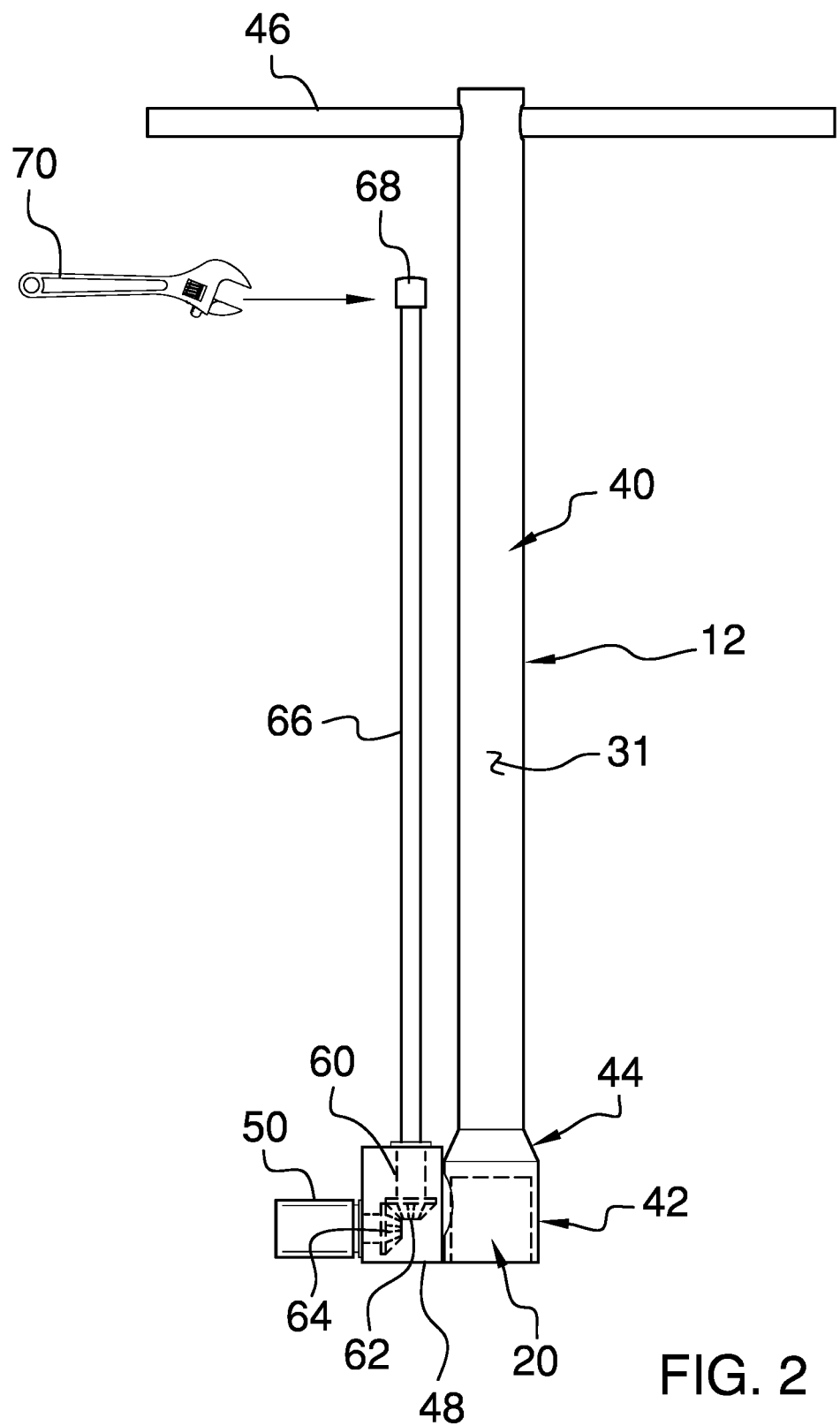
FIG. 2 is a front phantom view of an embodiment of the disclosure.
Figure 3:
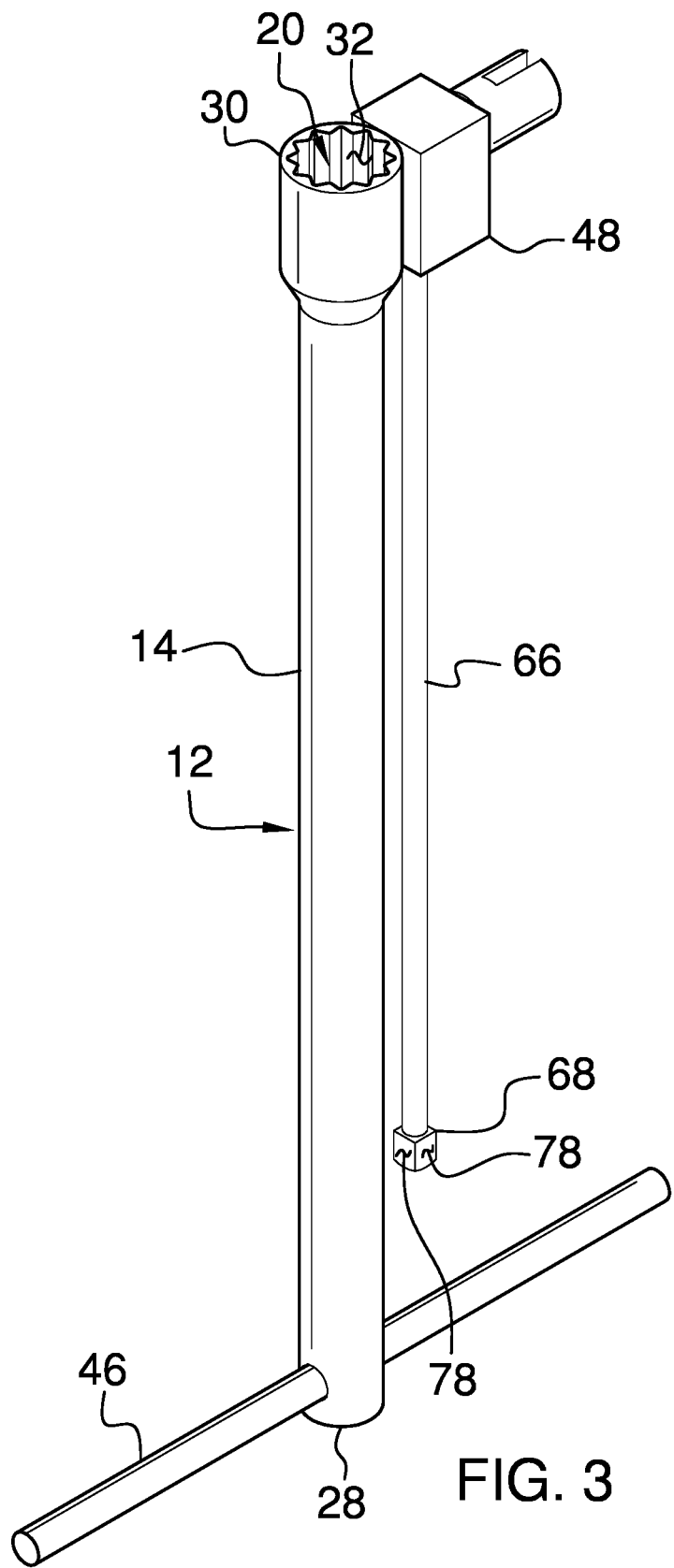
FIG. 3 is a bottom perspective view of an embodiment of the disclosure.
Figure 4:
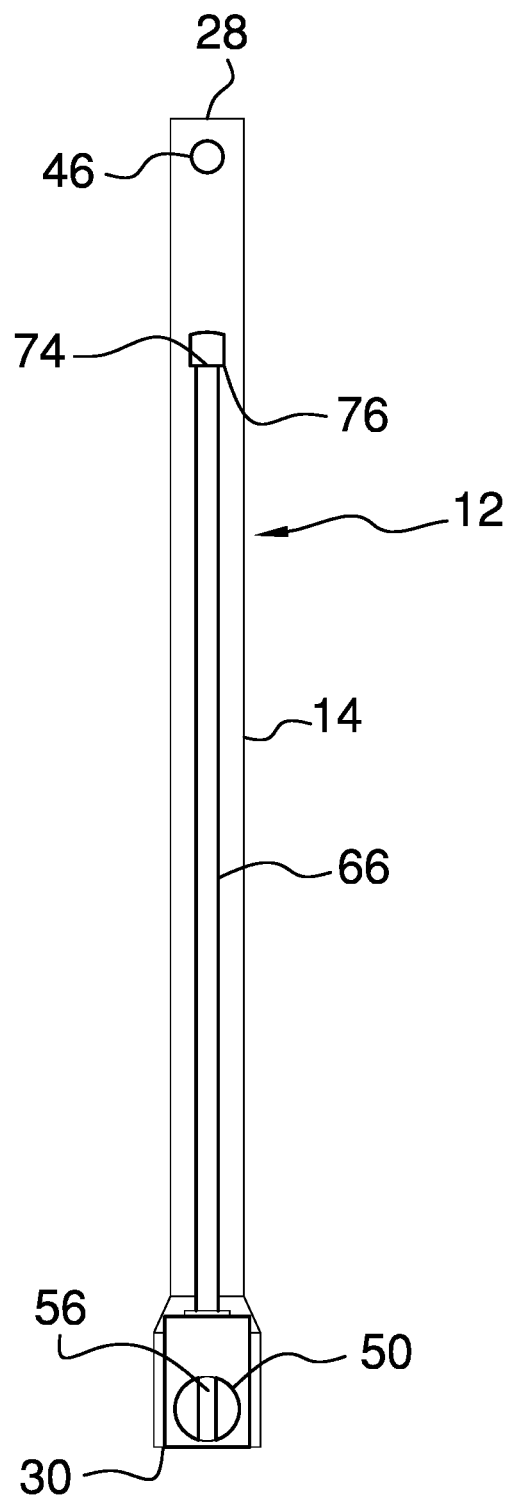
FIG. 4 is a right side view of an embodiment of the disclosure.
Figure 5:
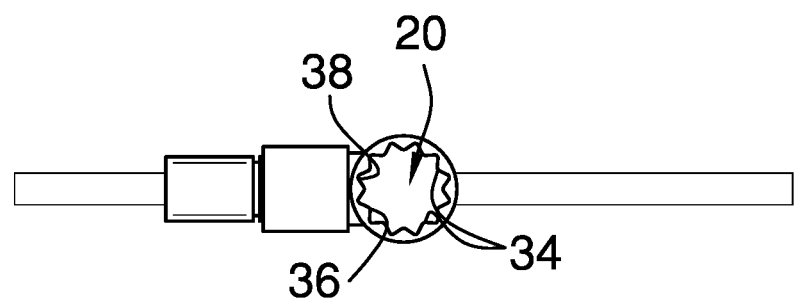
FIG. 5 is a bottom view of an embodiment of the disclosure.
Figure 6:
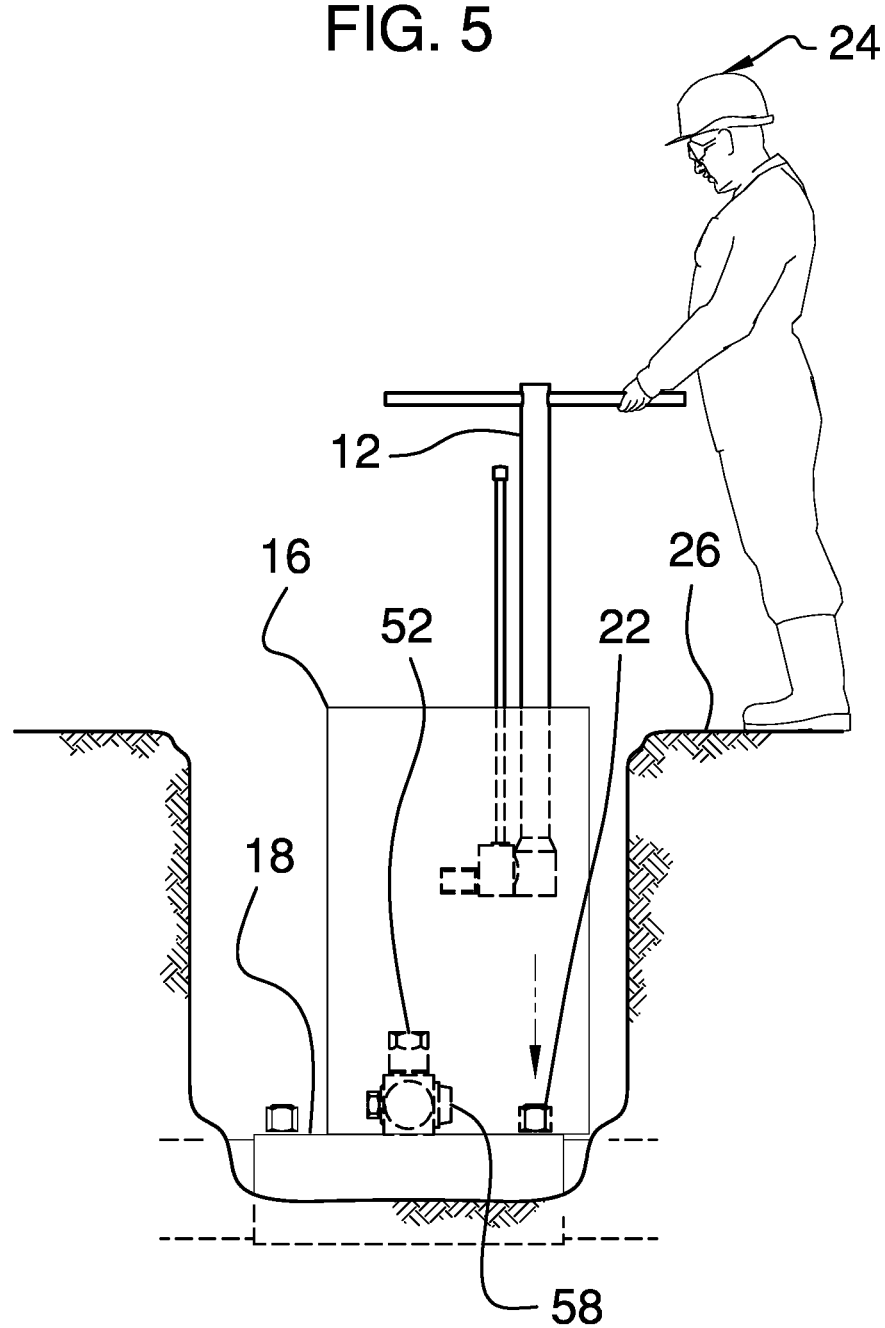
FIG. 6 is a perspective in-use view of an embodiment of the disclosure.

With reference now to the drawings, and in particular to FIGS. 1 through 6 thereof, a new water valve device embodying the principles and concepts of an embodiment of the disclosure and generally designated by the reference numeral 10 will be described.

As best illustrated in FIGS. 1 through 6, the water valve manipulation device 10 generally comprises a socket wrench 12 that has a shaft 14 which is elongated to a length of at least 2.0 meters thereby facilitating the socket wrench 12 to be extended down an access conduit 16 to engage a buried water line 18. The buried water line 18 may be a municipal water main, for example, or other type of buried water line that would commonly be serviced or inspected by municipal inspectors or construction worker 24s. The socket wrench 12 has a socket 20 for insertably receiving a test whip 22 attached to the buried water line 18. In this way the socket wrench 12 facilitates a worker 24 who is standing on the ground 26 to manipulate the test whip 22. Thus, the common practice of excavation to expose the buried water line 18 does not have to be performed to facilitate access to the test whip 22.

The socket wrench 12 has a top end 28, a bottom end 30 and an outside surface 31 extending between the top end 28 and the bottom end 30; the socket 20 extends into the bottom end 30 and the socket 20 has a bounding surface 32. The bounding surface 32 has a plurality of intersecting sides 34 that are arranged to form a repeating series of peaks 36 and valleys 38 thereby facilitating the socket 20 to engage a twelve point nut associated with the test whip 22. Furthermore, the socket 20 may have a functional diameter of 1¹⁵⁄₁₆ inches to fit the typical size of test whips that are employed in municipal water supply systems. The outside surface 31 has an upper portion 40, a lower portion 42 and a sloped portion 44 which slopes between the upper portion 40 and the lower portion 42. The lower portion 42 has a diameter that is greater than a diameter of the upper portion 40 and the sloped portion 44 is positioned closer to the bottom end 30 than the top end 28.

A handle 46 extends through the socket wrench 12 and the handle 46 is oriented transverse with the socket wrench 12. In this way the handle 46 can be gripped by the worker 24 for rotating the socket wrench 12. The handle 46 extends through the outside surface 31 of the socket wrench 12 at a point that is spaced from the top end 28 of the socket wrench 12. A gear box 48 is attached to the socket wrench 12 and the gear box 48 has an output shaft 50 that is oriented perpendicular to the socket wrench 12. In this way the output shaft 50 can engage a corporation valve 52 on the water line 18.

The gear box 48 is attached to the lower portion 42 of the outside surface 31 of the socket wrench 12 such that the gear box 48 is positioned adjacent to the bottom end 30 of the socket wrench 12. The output shaft 50 has a distal end 54 with respect to the gear box 48 and the output shaft 50 has a slot 56 extending from the distal end 54 toward the gear box 48. In this way the slot 56 can insertably receive a knob 58 of the corporation valve 52. The output shaft 50 extends along a line that is oriented perpendicular to an axis extending through the top end 28 and the bottom end 30 of the socket wrench 12. The gear box 48 has an input 60 that is directed toward the top end 28 of the socket wrench 12. The gear box 48 has a first gear 62 that is attached to the input 60 such that the input 60 rotates the first gear 62 and the gear box 48 has a second gear 64 that is attached to the output shaft 50. Furthermore, the first gear 62 enmeshes the second gear 64 at a right angle thereby transferring rotational torque applied to the input 60 to the output shaft 50.

An input shaft 66 is attached to the gear box 48 such that the input shaft 66 drives the gear box 48 when the input shaft 66 is rotated. The input shaft 66 has an engaging knob 68 that is disposed on the input shaft 66 thereby facilitating the engaging knob 68 to be engaged by a tool 70, such as an open end wrench, employed by the worker 24. The input shaft 66 has a length that is sufficient to expose the engaging knob 68 when the socket wrench 12 is extended down the access conduit 16. In this way the input shaft 66 facilitates the worker 24 standing on the ground 26 to close the corporation valve 52.

The input shaft 66 has a lower end 72 and an upper end 74 and the lower end 72 is mechanically engaged to the input 60 of the gear box 48. The input shaft 66 is oriented parallel to the socket wrench 12 having the upper end 74 being spaced downwardly from the handle 46. A lower surface 76 of the engaging knob 68 is attached to the upper end 74 of the input shaft 66. The engaging knob 68 has a plurality of outside surfaces 78 which intersect each other at right angles such that the engaging knob 68 has a rectangular shape.

In use, a corporation valve 52 and a test whip 22 are typically installed on a new water line 18 when the new water line 18 is installed. A conduit 16, such as a cardboard tube, is placed around the corporation valve 52 and the test whip 22 and the new water line 18 is backfilled with dirt. The socket wrench 12 is lowered into the conduit 16 to facilitate the socket 20 to engage the test whip 22 and to facilitate the output shaft 50 to engage the knob on the corporation valve 52. The input shaft 66 is rotated, with a wrench or other similar type of tool, in order to rotate the output shaft 50 to close the corporation valve 52. The handle 46 is gripped when the corporation valve 52 is closed and the handle 46 is forcefully manipulated to rotate the socket wrench 12 in a counterclockwise direction to loosen the test whip 22. In this way the test whip 22 can be removed from the new water line 18 without having to excavate the new water line 18 to facilitate the worker 24 to access the test whip 22.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A water valve manipulation device comprising:
   a socket wrench having a shaft being elongated to a length of at least 2.0 meters thereby facilitating said socket wrench to be extended down an access conduit to engage a buried water line, said socket wrench having a socket for insertably receiving a test whip attached to the buried water line wherein socket wrench is configured to facilitate a worker standing on the ground to manipulate said test whip;
   a handle extending through said socket wrench, said handle being oriented transverse with said socket wrench wherein said handle is configured to be gripped by the worker for rotating said socket wrench;
   a gear box being attached to said socket wrench, said gear box having an output shaft being oriented perpendicular to said socket wrench thereby facilitating said output shaft to engage a corporation valve on a water main; and
   an input shaft being attached to said gear box such that said input shaft drives said gear box when said input shaft is rotated, said input shaft having an engaging knob being disposed on said input shaft wherein said engaging knob is configured to be engaged by an open end wrench employed by the worker, said input shaft having a length being sufficient to expose said engaging knob when said socket wrench is extended down said access conduit wherein said input shaft is configured to facilitate the worker standing on the ground to close said corporation valve.

2. The device according to claim 1, wherein:

said socket wrench has a top end and a bottom and an outside surface extending between said top end and said bottom end;

said socket extends into said bottom end;

said socket has a bounding surface, said bounding surface having a plurality of intersecting sides that are arranged to form a repeating series of peaks and valleys thereby facilitating said socket to engage a twelve point nut associated with said test whip;

said outside surface has an upper portion and a lower portion and a sloped portion which slopes between said upper portion and said lower portion;

said lower portion having a diameter being greater than a diameter of said upper portion; and said sloped portion is positioned closer to said bottom end than said top end.

3. The device according to claim 2, wherein said gear box is attached to said lower portion of said outside surface of said socket wrench such that said gear box is positioned adjacent to said bottom end of said socket wrench.

4. The device according to claim 3, wherein said output shaft has a distal end with respect to said gear box, said output shaft having a slot extending from said distal end toward said gear box thereby facilitating said slot to insertably receive a knob of said corporation valve, said output shaft extending along a line being oriented perpendicular to an axis extending through said top end and said bottom end of said socket wrench.

5. The device according to claim 4, wherein;

said gear box has an input being directed toward said top end of said socket wrench;

said gear box has a first gear being attached to said input such that said input rotates said first gear; and said gear box has a second gear being attached to said output shaft, said first gear enmeshing said second gear at a right angle thereby transferring rotational torque applied to said input to said output shaft.

6. The device according to claim 1, wherein said input shaft has a lower end and an upper end, said lower end being mechanically engaged to an input of said gear box such that said input shaft is oriented parallel to said socket wrench having said upper end being spaced downwardly from said handle, a lower surface of said engaging knob being attached to said upper end of said input shaft, said engaging knob having a plurality of outside surfaces which intersect each other at right angles such that said engaging knob has a rectangular shape.

7. A water valve manipulation device comprising:

a socket wrench having a shaft being elongated to a length of at least 2.0 meters thereby facilitating said socket wrench to be extended down an access conduit to engage a buried water line, said socket wrench having a socket for insertably receiving a test whip attached to the buried water line wherein socket wrench is configured to facilitate a worker standing on the ground to manipulate said test whip, said socket wrench having a top end and a bottom and an outside surface extending between said top end and said bottom end, said socket extending into said bottom end, said socket having a bounding surface, said bounding surface having a plurality of intersecting sides that are arranged to form a repeating series of peaks and valleys thereby facilitating said socket to engage a twelve point nut associated with said test whip, said outside surface having a upper portion and a lower portion and an sloped portion which slopes between said upper portion and said lower portion, said lower portion having a diameter being greater than a diameter of said upper portion, said sloped portion being positioned closer to said bottom end than said top end;

a handle extending through said socket wrench, said handle being oriented transverse with said socket wrench wherein said handle is configured to be gripped by the worker for rotating said socket wrench, said handle extending through said outside surface of said socket wrench at a point being spaced from said top end of said socket wrench;

a gear box being attached to said socket wrench, said gear box having an output shaft being oriented perpendicular to said socket wrench thereby facilitating said output shaft to engage a corporation valve on a water main, said gear box being attached to said lower portion of said outside surface of said socket wrench such that said gear box is positioned adjacent to said bottom end of said socket wrench, said output shaft having a distal end with respect to said gear box, said output shaft having a slot extending from said distal end toward said gear box thereby facilitating said slot to insertably receive a knob of said corporation valve, said output shaft extending along a line being oriented perpendicular to an axis extending through said top end and said bottom end of said socket wrench, said gear box having an input being directed toward said top end of said socket wrench, said gear box having a first gear being attached to said input such that said input rotates said first gear, said gear box having a second gear being attached to said output shaft, said first gear enmeshing said second gear at a right angle thereby transferring rotational torque applied to said input to said output shaft; and an input shaft being attached to said gear box such that said input shaft drives said gear box when said input shaft is rotated, said input shaft having an engaging knob being disposed on said input shaft wherein said engaging knob is configured to be engaged by an open end wrench employed by the worker, said input shaft having a length being sufficient to expose said engaging knob when said socket wrench is extended down said access conduit wherein said input shaft is configured to facilitate the worker standing on the ground to close said corporation valve, said input shaft having a lower end and an upper end, said lower end being mechanically engaged to said input of said gear box such that said input shaft is oriented parallel to said socket wrench having said upper end being spaced downwardly from said handle, a lower surface of said engaging knob being attached to said upper end of said input shaft, said engaging knob having a plurality of outside surfaces which intersect each other at right angles such that said engaging knob has a rectangular shape.

* * * * *